(12) United States Patent
Kim

(10) Patent No.: US 6,342,821 B1
(45) Date of Patent: Jan. 29, 2002

(54) DEVICE CAPABLE OF QPSK MODULATION AND PHASE COMPENSATOR FOR THE SAME

(75) Inventor: Dong Won Kim, Kyongsangbuk-do (KR)

(73) Assignee: Hynix Semiconductor, Inc., Kyoungki-do (KR)

( * ) Notice: Subject to any disclaimer, the term of this patent is extended or adjusted under 35 U.S.C. 154(b) by 0 days.

(21) Appl. No.: 09/491,431

(22) Filed: Jan. 26, 2000

(30) Foreign Application Priority Data

Jan. 25, 1999 (KR) ................................................ 99/2295

(51) Int. Cl.[7] .............................................. H04L 27/20
(52) U.S. Cl. ........................ 332/104; 375/379; 375/308
(58) Field of Search .............................. 332/103, 104, 332/105; 375/261, 279, 281, 298, 308

(56) References Cited

U.S. PATENT DOCUMENTS

| 4,940,954 A | * | 7/1990 | Aubert et al. ................ 332/103 |
| 5,387,883 A | * | 2/1995 | Ueda ............................ 332/103 |
| 5,561,401 A | * | 10/1996 | Mineo .......................... 332/103 |
| 5,694,093 A | * | 12/1997 | DaSilva et al. ............... 332/103 |

* cited by examiner

Primary Examiner—Siegfried H. Grimm

(57) ABSTRACT

A device and method capable of QPSK(Quadrature Phase Shift Keying) modulation, which up-converts a baseband signal to an IF(Intermediate frequency) signal. A phase compensator receives a digital I-signal (In-Phase signal) and a digital Q-signal (Quadrature-Phase signal) from a I/Q local signal forwarder. The phase compensator delays at least one of the received signals an amount necessary to realize a 90° phase difference between two baseband signals used to form a Quadrature Phase Shift Key output, effectively compensating for relative delays in the two baseband signals that would otherwise result in a phase difference that differs from the requisite 90° phase difference. The phase compensator includes a selector for subjecting external selection code signals to logical operations resulting in generation of first and second selection signals, and a delay for delaying apositive I-signal, a negative I-signal, a positive Q-signal and a negative Q-signal for time periods different from one another in response to the first and second selection signals received from the selector.

21 Claims, 5 Drawing Sheets

DEVICE CAPABLE OF QPSK MODULATION AND PHASE COMPENSATOR FOR THE SAME

BACKGROUND OF THE INVENTION

1. Field of the Invention

The present invention relates to a device capable of QPSK(Quadrature Phase Shift Keying) modulation which up-converts a baseband signal to an IF(Intermediate frequency) signal in a communication field such as a CDMA (Code Division Multiple Access) communication field, and more particularly, to a phase compensator capable of compensating a phase error between an in-phase signal (I-signal) and a quadrature-phase signal (Q-signal).

2. Background of the Invention

A related art device and method of QPSK modulation will be explained with reference to the attached drawings. FIG. 1 illustrates a related art device capable of QPSK modulation.

Referring to FIG. 1, a related art device capable of QPSK modulation is provided with a first 8-bit digital-to-analog converter (DAC) 1 for receiving an 8-bit digital signal TXD7-0 synchronous to a rising edge of a clock signal TXCLK and converting that received digital signal into an analog signal, a second 8-bit digital-to-analog converter (DAC) 2 for receiving an 8-bit digital signal TXD7-0 synchronous to a falling edge of the clock signal TXCLK and converting that received digital signal into an analog signal, a first low-pass filter 3 for filtering the analog signal from the first 8-bit digital-to-analog converter 1 to provide only a baseband signal, a second low-pass filter 4 for filtering the analog signal from the second 8-bit digital-to-analog converter 2 to provide only a baseband signal, an I/Q local signal forwarder for forwarding a digital I-signal (In-Phase signal) and a digital Q-signal (Quadrature-Phase signal), respectively, a first mixer 6 for receiving and mixing the I-signal from the I/Q local signal forwarder 5 and the signal from the first low-pass filter 3 and for generating an IF band signal therefrom, a second mixer 7 for receiving and mixing the Q-signal from the I/Q local signal forwarder 5 and the signal from the second low-pass filter 4 and for generating an IF band signal therefrom, and a summer 8 for summing the signals from the first and second mixers 6 and 7, respectively, and for generating 2-bit TXIF and TXIF/ signals therefrom. The I-signal and the Q-signal have a 90° phase difference. The related art device of FIG. 1 can be configured for wireless communications, or the like, where items 1–8 are configured for signals in a communication field such as CDMA.

A related art method capable of QPSK modulation via the aforementioned related art device will be explained. In the QPSK modulation having an I-channel and Q-channel, four states of phases (for example, 0, π/2, π, 3π/2) are used for transmission of information.

An 8-bit digital data is provided to the first digital-to-analog converter 1 at a rising edge of a transmission clock signal TXCLK, and an 8-bit digital data is provided to the second digital-to-analog converter 2 at a falling edge of a transmission clock signal TXCLK. The first and second digital-to-analog converters 1 and 2 convert the received 8-bit digital data into analog signals, respectively. The first and second low-pass filters 3 and 4 respectively filter the analog signals received from the first and second digital-to-analog converters 1 and 2, and each provides a baseband signal. The first mixer 6 mixes an I-signal received from the I/Q local signal forwarder 5 and the baseband signal received from the first low-pass filter 3, and generates an IF band signal therefrom. The second mixer 7 mixes the Q-signal received from the I/Q local signal forwarder 5 and the baseband signal received from the second low-pass filter 4, and generates an IF band signal therefrom. The summer 8 then sums the I-channel IF signal and the Q-channel IF signal received from the first and second mixers 6 and 7, respectively, and generates 2-bit TXIF and TXIF/signals therefrom.

As described, the related art device has at least the following problems.

In the QPSK modulation, the I-signal and the Q-signal should have a phase difference of exactly 90°. However, because of differences in delays of the I-signal and the Q-signal in the I-signal and Q-signal paths through the DACs 1–2, filters 3–4 and mixers 6–7, and because of timing differences of the rising edges and the falling edges caused by TXCLK duty cycle errors, despite a required TXCLK duty of exactly 50, the I-signal and the Q-signal mixed at mixers 6 and 7 do not generally have a phase difference of exactly 90°, but instead have a phase difference that differs from 90° by some error. If this error is experienced at the transmission side, the I-signal and the Q-signal become difficult to restore at a reception side.

SUMMARY OF THE INVENTION

Accordingly, the present invention is directed to a phase compensator that substantially obviates one or more of the problems due to limitations and disadvantages of the related art.

An object of the present invention is to provide a phase compensator for compensating a phase error occurring between an in-phase signal and a quadrature-phase signal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a phase compensator to ensure a phase difference of 90° required for QPSK. The phase compensator receives a digital I-signal (In-Phase signal) and a digital Q-signal (Quadrature-Phase signal) from a I/Q local signal forwarder. The phase compensator delays at least one of the received signals an amount necessary to realize a 90° phase difference between two baseband signals used to form a Quadrature Phase Shift Key output, effectively compensating for relative delays in the two baseband signals that would otherwise result in a phase difference that differs from the requisite 90° phase difference.

The device of QPSK modulation includes a first digital-to-analog converter for converting an 8-bit digital signal into an analog signal synchronous to a rising edge of a clock signal, a second digital-to-analog converter for converting an 8-bit digital signal into an analog signal synchronous to a falling edge of a clock signal, a first low-pass filter for filtering the analog signal from the first digital-to-analog converter to provide only abaseband signal, a second low-pass filter for filtering the analog signal from the second digital-to-analog converter to provide only a baseband signal, an I/Q local signal forwarder for forwarding a digital I-signal and a digital Q-signal respectively, an I/Q phase compensator for compensating the I-signal and the Q-signal from the I/Q local signal forwarder for a phase error, a first mixer for mixing the I-signal from the I/Q phase compensator and the signal from the first low-pass filter to make an up conversion to an IF band, a second mixer for mixing the Q-signal from the I/Q phase compensator and the signal from the second low-pass filter to make an up conversion to an IF band, and a summer for summing signals from the first and second mixers to provide 2-bits of TXIF and TXIF/ signals.

Another aspect of the present invention includes a phase compensator with a selector for subjecting external selection code signals to a logical operation resulting in the generation of a first selection signal and a second selection signal, and a delay for delaying a positive I-signal, a negative I-signal, a positive Q-signal and a negative Q-signal for time periods different from one another in response to the first and second selection signals generated by the selector.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
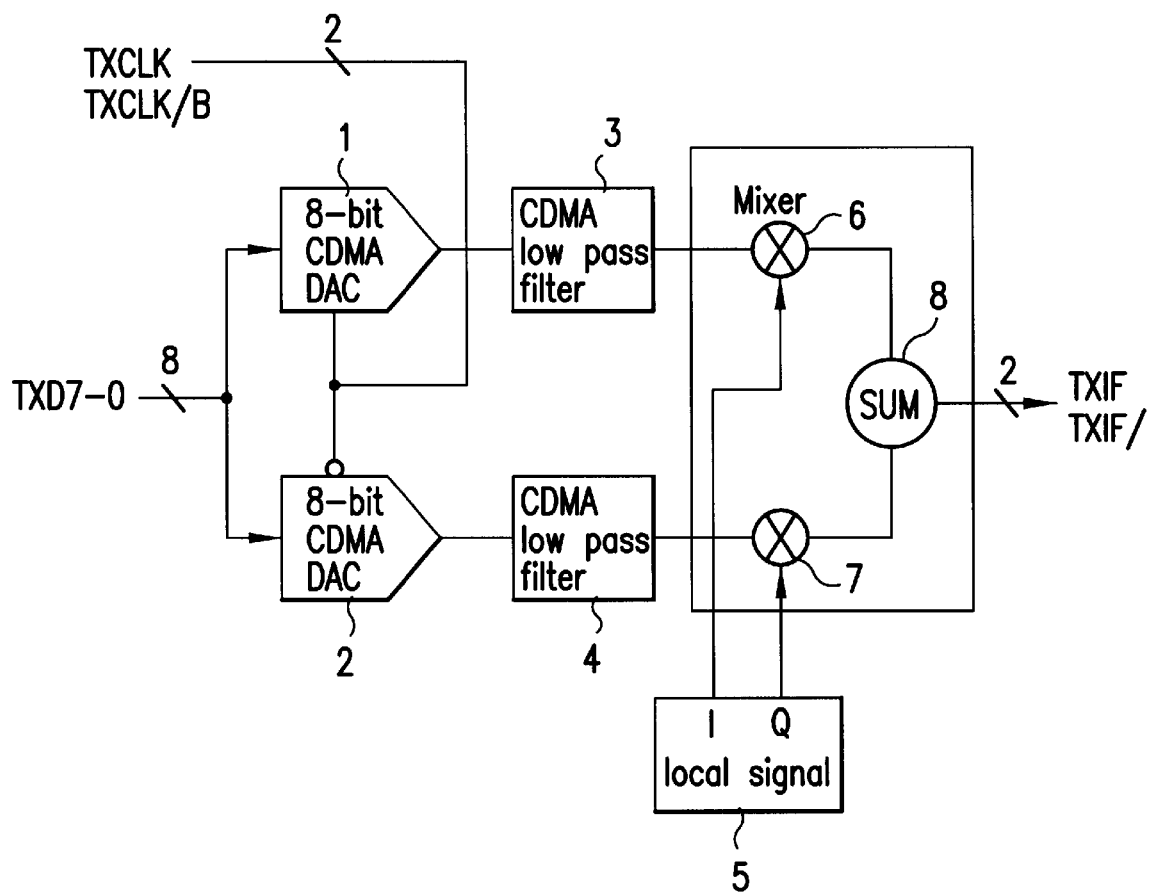
FIG. 1 illustrates a related art device of QPSK modulation.
Figure 2:
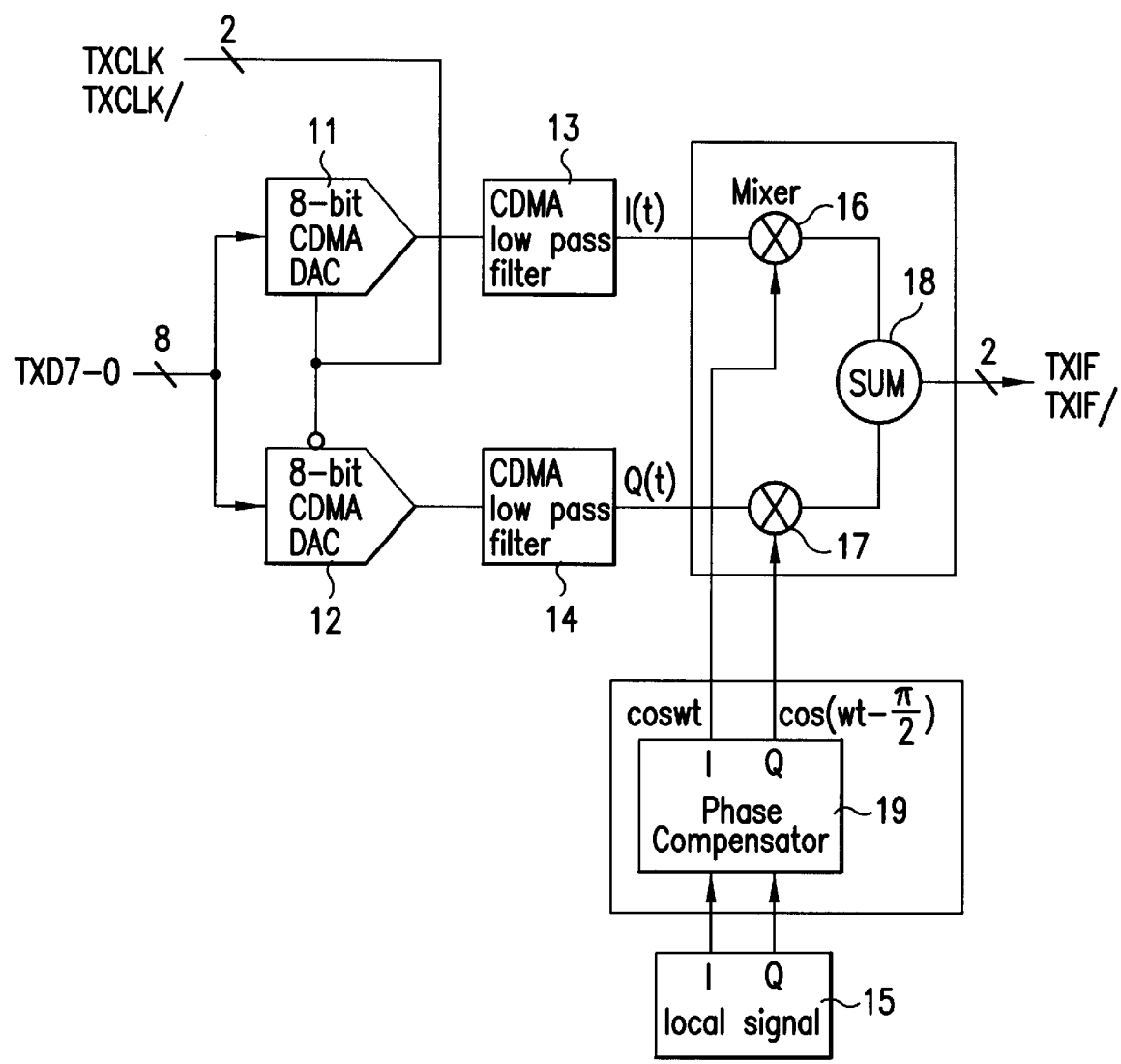
FIG. 2 illustrates a device of QPSK modulation in accordance with a preferred embodiment of the present invention.

Reference will now be made in detail to the preferred embodiments of the present invention, examples of which are illustrated in the accompanying drawings. FIG. 2 illustrates a device capable of QPSK modulation in accordance with a preferred embodiment of the present invention, and FIG. 3 illustrates details of a phase compensator according to a preferred embodiment of the present invention, such as that shown in FIG. 2.

Referring to FIG. 2, a device capable of QPSK modulation in accordance with a preferred embodiment of the present invention includes a first digital-to-analog converter (DAC) 11 for receiving an 8-bit digital signal TXD7-0 synchronous to a rising edge of a clock signal TXCLK and for converting that received digital signal into an analog signal, a second digital-to-analog converter (DAC) 12 for receiving an 8-bit digital signal TXD7-0 synchronous to a falling edge of the clock signal TXCLK and for converting that received digital signal into an analog signal, a first low-pass filter 13 for filtering the analog signal received from the first digital-to-analog converter 11 to provide only a baseband signal, a second low-pass filter 14 for filtering the analog signal received from the second digital-to-analog converter 12 to provide only a baseband signal, an I/Q local signal forwarder 15 for forwarding a digital I-signal (In-Phase signal) and a digital Q-signal (Quadrature-Phase signal) respectively, an I/Q phase compensator 19 for compensating the I-signal and the Q-signal received from the I/Q local signal forwarder 15 for a phase error within the baseband signals, a first mixer 16 for receiving and mixing the I-signal from the I/Q phase compensator 19 and the signal from the first low-pass filter 13 and for generating an IF band signal therefrom, a second mixer 17 for receiving and mixing the Q-signal from the I/Q phase compensator 19 and the signal from the second low-pass filter 14 and for generating an IF band signal therefrom, and a summer 18 for summing the signals received from the first and second mixers 16 and 17 and for TXIF and TXIF/signals.

Figure 3:
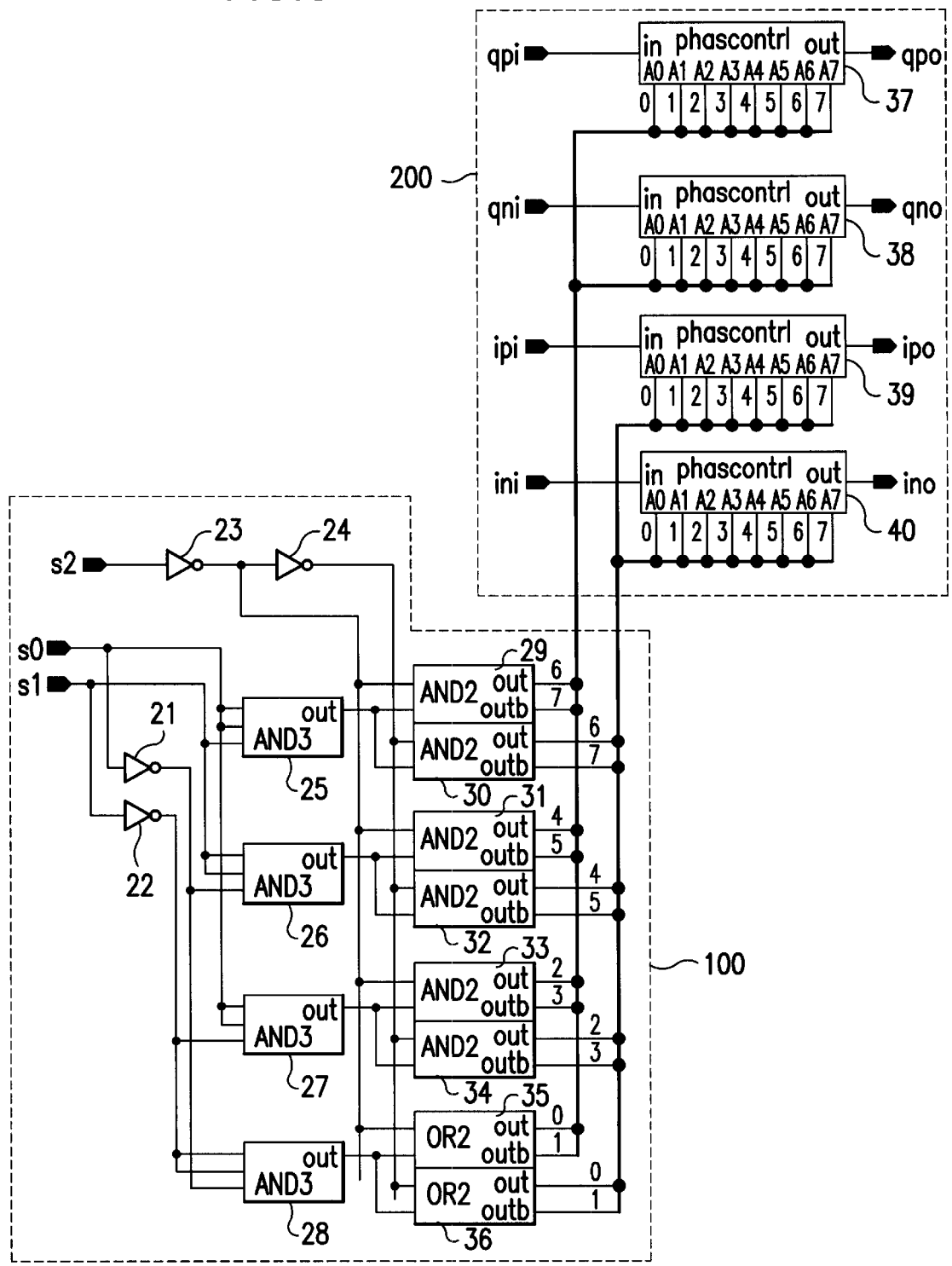
FIG. 3 illustrates details of a phase compensator according to a preferred embodiment of the present invention, such as that shown in FIG. 2.

A detailed example of an I/Q phase compensator 19 in accordance with a preferred embodiment of the present invention is shown in FIG. 3. The I/Q compensator 19 shown in FIG. 3 includes a selector 100 for selecting an external selection code signal and a delay 200 for delaying according to a signal selected at the selector 100.

The selector 100 includes a first inverter 21 for inverting a first selection code signal s0, a second inverter 22 for inverting a second selection code signal s1, a third inverter 23 for inverting a third selection code signal s2, a fourth inverter 24 for inverting a signal from the third inverter 23, a first AND gate 25 for subjecting the first and second selection code signals s0 and s1 to a logical AND operation, a second AND gate 26 for subjecting a signal from the first inverter 21 and the second selection code signal s1 to a logical AND operation, a third AND gate 27 for subjecting the first selection code signal s0 and a signal from the second inverter 22 to a logical AND operation, a fourth AND gate 28 for subjecting signals from both the first and second inverters 21 and 22 to a logical AND operation, a fifth AND gate 29 for subjecting signals from both the first AND gate 25 and the third inverter 23 to a logical AND operation, a sixth AND gate 30 for subjecting signals from both the first AND gate 25 and the fourth inverter 24 to a logical AND operation, a seventh AND gate 31 for subjecting signals from both the second AND gate 26 and the third inverter 23 to a logical AND operation, an eighth AND gate 32 for subjecting signals from both the second AND gate 26 and the fourth inverter 24 to a logical AND operation, a ninth AND gate 33 for subjecting signals from both the third AND gate 27 and the third inverter 23 to a logical AND operation, a tenth AND gate 34 for subjecting signals from both the third AND gate 27 and the fourth inverter 24 to a logical AND operation, a first OR gate 35 for subjecting signals from both the fourth AND gate 28 and the third inverter 23 to a logical OR operation, and a second OR gate 36 for subjecting signals from both the fourth AND gate 28 and the fourth inverter 24 to a logical OR operation.

Delay 200 of the I/Q phase compensator shown by FIG. 3 includes a first delay unit 37 for delaying a positive Q-signal (qpi) from the I/Q local signal forwarder 15 in response to signals from the fifth, seventh and ninth AND gates 29, 31 and 33 and the first OR gate 35, a second delay unit 38 for delaying a negative Q-signal (qni) from the I/Q local signal forwarder 15 in response to signals from the fifth, seventh and ninth AND gates 29,31 and 33 and the first OR gate 35, a third delay unit 39 for delaying a positive I-signal (ipi) from the I/Q local signal forwarder 15 in response to signals from the sixth, eighth and tenth AND gates 30, 32 and 34 and the second OR gate 36, and a fourth delay unit 40 for delaying a negative I-signal (ini) from the I/Q local signal forwarder 15 in response to signals from the sixth, eighth and tenth AND gates 30, 32 and 34 and the second OR gate 36.

Figure 4:
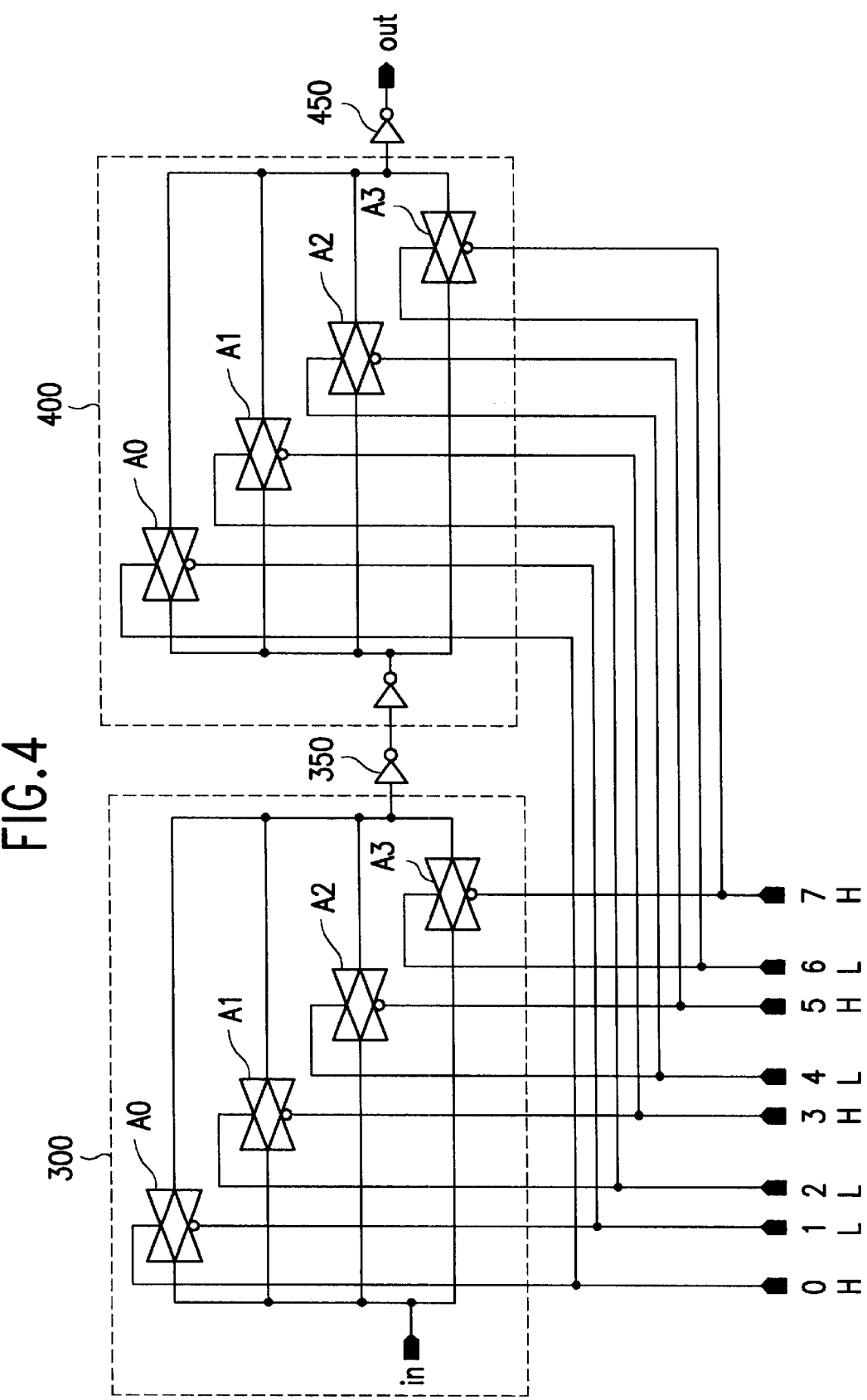
FIG. 4 illustrates a circuit of a delay unit according to a preferred embodiment of the present invention, such as that shown in FIG. 3; and, FIG. 5 illustrates input/output waveforms at a phase delay unit of the present invention.

A detailed example of a delay unit with I/Q phase compensator 19, such as delay units 37–40 of FIG. 3, will be explained in accordance with a preferred embodiment of the present invention. FIG. 4 illustrates a circuit of the delay unit according to a preferred embodiment of the present invention, such as that shown in FIG. 3.

Signals (e.g., a non-inverted signal and an inverted signal) from the first and second OR gates 35 and 36 of FIG. 3, respectively, are provided to zero(th) (0) and first (1) pin input terminals on each of the delay units. Signals (e.g., a non-inverted signal and an inverted signal) from the ninth and tenth AND gates 33 and 34, respectively, are provided to a second (2) and a third (3) pin input terminals on each of the delay units. Signals (e.g., a non-inverted signal and an inverted signal) from the seventh and eighth AND gates 31 and 32, respectively, are provided to a fourth (4) and a fifth (5) pin input terminals on each of the delay units. Signals (e.g., a non-inverted signal and an inverted signal) from the seventh and eighth AND gates 29 and 30, respectively, are provided to a sixth (6) and a seventh (7) pin input terminals on each of the delay units. Accordingly, each delay unit 37–40 includes a first delay part 300 for receiving and delaying I and Q signals in response to a signal from the selector 100, a fifth inverter 350 for inverting an output from the first delay part 300, a second delay part 400 for delaying a signal from the fifth inverter 350, and a sixth inverter 450 for inverting a signal from the second delay part 400. Each of the first and second delay parts 300 and 400 includes a first transmission gate A0 for delaying an external signal for a given time period >a= in response to signals received at the zero(th) (0) and first (1) pins before transmission, a second transmission gate A1 for delaying an external signal for a given time period >b= in response to signals received at the second (2) and third (3) pins before transmission, a third transmission gate A2 for delaying an external signal for a given time period >c= in response to signals received at the fourth (4) and a fifth (5) pins before transmission, and a fourth transmission gate A3 for delaying an external signal for a given time period >d= in response to signals received at the sixth (6) and a seventh (7) pins before transmission. The delay time periods >a=, >b=, >c= and >d= have relations of >a=<>b=<>c=<>d=.

The operations of the device of QPSK modulation and the phase compensator of the present invention will now be explained. It is explained in the related art that there is a phase variation in an up-conversion, resulting in a phase difference between the I-signal and Q-signal. From a spectrum measurement, this phenomenon is known to result in high USB (upper side band) components, which are preferably suppressed. A phase error, which is an important parameter, is measured as follows. The most ideal IF[I(t), Q(t)] band signals and I/Q local signals($I_{LO}, Q_{LO}$) in a QPSK modulation are as follows:

$I(t) = \cos \Psi t$,
$Q(t) = \sin \Psi = \cos(\pi t - \pi/2)$,
$I_{LO} = \cos \omega t$, and
$Q_{LO} = \sin \omega t = \cos(\omega t - \pi/2)$.

Based on these ideal signals, a QPSK modulated signal $f\{I(t), Q(t)\}$ can be expressed as follows:

$$f\{I(t), Q(t)\} = I(t)XI_{LO} + Q(t)XQ_{LO},$$
$$= \cos\psi t\cos\omega t + \cos(\psi t - \pi/2)\cos(\omega t - \pi/2),$$
$$= 1/2\{\cos(\omega t + \psi t) + \cos(\omega t - \psi t)\} +$$
$$1/2\{\cos(\omega t + \psi t - \pi) + \cos(\omega t - \psi t)\},$$

and $$= \cos(\omega t - \psi t).$$

That is, in an ideal case, only an LSB component [$\cos(\omega-\Psi t)$] is given. However, if there is a phase mismatch component $\epsilon$, the IF[I(t), Q(t)] band signals and I/Q local signals ($I_{LO}, Q_{LO}$) in a QPSK modulation are as follows:

$I(t) = \cos \Psi t$,
$Q(t) = \sin \Psi t = \cos(\Psi t - /2)$,
$I_{LO} = \cos \Psi t$, and
$Q_{LO} = \sin(\omega t + \epsilon) = \cos(\omega t - \pi/2 + \epsilon)$.

Therefore, when phase mismatch occurs, QPSK modulated signal $f\{I(t), Q(t)\}$ can be expressed as follows:

$$f\{I(t), Q(t)\} = I(t)XI_{LO} + Q(t)XQ_{LO},$$
$$= \cos\psi t\cos\omega t + \cos(\psi t - \pi/2)\cos(\omega t - \pi/2 + \varepsilon),$$
$$= 1/2\{\cos(\omega t + \psi t) + \cos(\omega t - \psi t)\}, +$$
$$1/2\{\cos(\omega t + \psi t - \pi + \varepsilon) + \cos(\omega t - \psi t + \varepsilon)\},$$

and $$= 1/2\{\cos(\omega t + \psi t) + \cos(\omega t - \psi t)\} +$$
$$1/2\{\cos(\omega t + \psi t + \varepsilon) + \cos(\omega t + \psi t + \varepsilon)\}.$$

As can be appreciated from the above, due to a phase mismatch component $A\epsilon@$, a USB component ($\omega t+\Psi t$) is not offset; rather, it remains. The phase error component $A\epsilon@$ results from a time delay and the like in a circuit. If $f_{LO}$ denotes a frequency of the signal L0 from the I/Q local signal forwarder 15, the following equations can be established:

360E=1/$f_{LO}$: a time period of one cycle, where

1E=1/(360×$f_{Lo}$).

If a time delay by a unit delay cell is Atd@, a phase angle to be compensated is td/(360×$f_{Lo}$). If the signal L0 has a frequency of 130.38 MHz, a period of a cycle >T= maybe described as indicated below, and, if one cycle is set to be 360E, T=7.66988 nsec=360E, where 1E=21.3 psec.

That is, if there is a delay of 21.3 psec in the signal L0, a phase error of 1E results. Therefore, it is intended in the present invention that the phase error is compensated using the delay. As there is approx. 8E of allowance for the phase error, 8E of delay is provided on each stage.

The operation of the present invention will be explained.

The operation of the device of QPSK modulation of the present invention differs from the related art primarily in that a signal from the I/Q local signal forwarder 15 is compensated by the phase compensator 19, which operation will be explained below.

The phase compensator 19 delays an I-signal and a Q-signal from the I/Q local signal forwarder 15 to compensate a phase of an overall QPSK modulation according to selection code signals s0, s1 and s2, which are digital signals. In the preferred embodiment of the present invention, the selection code signals s0–s2 are provided to the compensator 19 in succession, from "000" to "111". TXIF and /TXIF signals from the summer 18, corresponding to the selection code signals s0–s2, are measured by spectrum to obtain respective LSB components. Then, one of the selection code signals corresponding to a minimum LSB component is detected. Therefore, the detected selection code signal is set for compensating the phase error between the I-signal and the Q-signal.

A delay path for each channel to be compensated according to the selection code signals s0, s1 and s2 is as shown in Table 1.

TABLE 1

| s0 | s1 | s2 | I-channel path | Q-channel path |
|---|---|---|---|---|
| 0 | 0 | 0 | A0 | A0 |
| 1 | 0 | 0 | A0 | A1 |
| 0 | 1 | 0 | A0 | A2 |
| 1 | 1 | 0 | A0 | A3 |
| 0 | 0 | 1 | A0 | A0 |
| 1 | 0 | 1 | A1 | A0 |
| 0 | 1 | 1 | A2 | A0 |
| 1 | 1 | 1 | A3 | A0 |

Accordingly, if the first transmission gate A0 has substantially no time delay, the second transmission gate A1 has a 170 psec time delay, the third transmission gate A2 has a 340 psec time delay, and the fourth transmission gate A3 has a 510 psec time delay, the second, third and fourth transmission gates A1, A2 and A3 are phase compensated by 8E, 16E and 24E, respectively.

Figure 5:
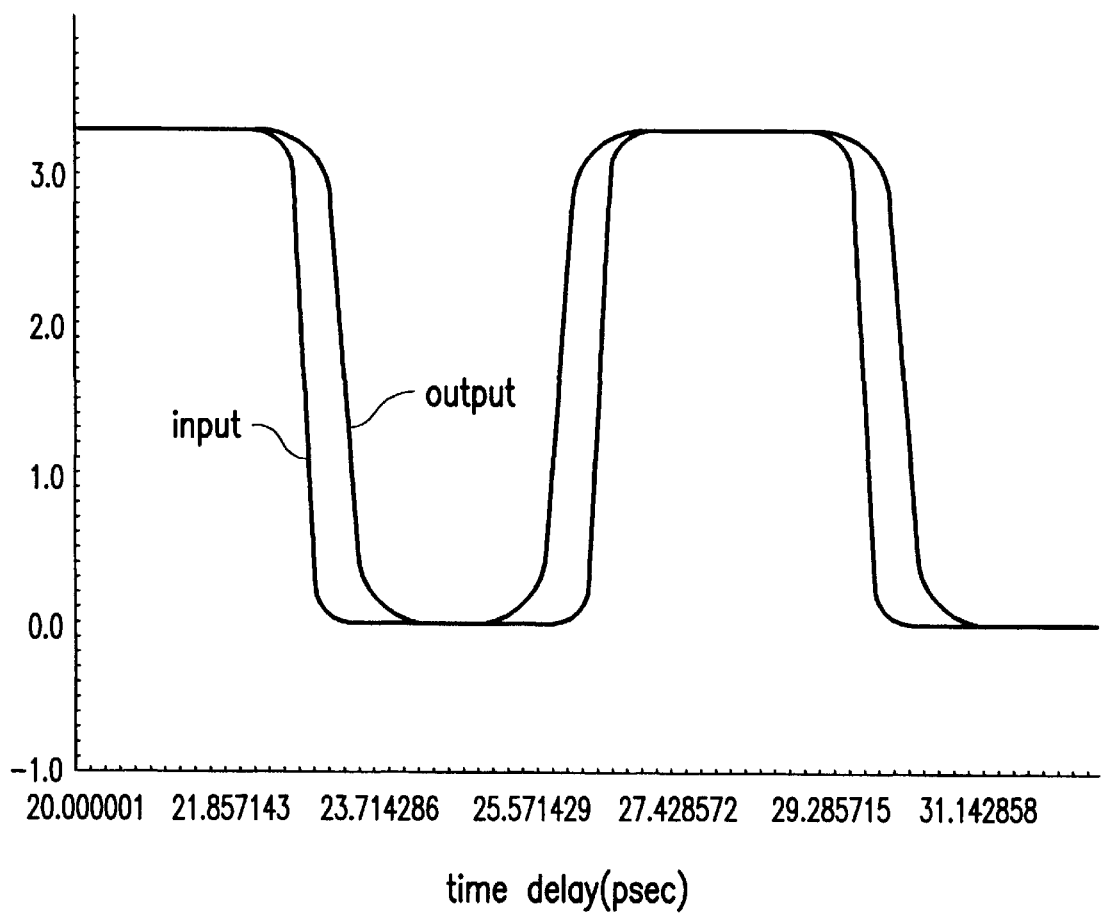

FIG. 5 illustrates input/output waveforms at a phase delay unit of the present invention in accordance with the above preferred embodiment of the present invention.

The device of QPSK modulation and the phase compensator of the present invention have at least the following advantages.

The phase is compensated by the phase compensator of the present invention such that a phase difference of exactly 90° may be achieved between the I-signal and the Q-signal to enable exact restoration of an original signal of the I/O signal in demodulation, effectively reducing signal distortion and improving reliability.

It will be apparent to those skilled in the art that various modifications and variations can be made in the device of QPSK modulation and the phase compensator of the present invention without departing from the spirit or scope of the invention. Furthermore, it will be readily apparent to those of ordinary skill that the concepts and specific implementations of the present invention may be applied to various forms of communication, including communications performed using CDMA protocol. Thus, it is intended that the present invention covers the modifications and variations of this invention provided they come within the scope of the appended claims and their equivalents.

What is claimed is:

1. A device capable of Quadrature Phase Shift Keying modulation of digital baseband signals having a phase difference that is greater than zero, comprising:

a phase compensator that generates digital signals having a phase difference that is based on the phase difference of the digital baseband signals being modulated;

a first mixer that receives a first of the digital signals from the phase compensator and a first of the digital baseband signals being modulated, and that generates a first output signal;

a second mixer that receives a second of the digital signals from the phase compensator and a second of the digital baseband signals being modulated, and that generates a second output signal; and a summer that generates a modulation signal based on the first and second output signals.

2. The device of claim 1, wherein the phase compensator includes a delay unit that delays at least one of the digital signals generated by the phase compensator relative to another of the digital signals generated by the phase compensator.

3. The device of claim 2, wherein the delay introduced by the delay unit of the phase compensator results in a phase difference between the signals generated by the phase compensator that corresponds to the phase difference of the digital baseband signals being modulated.

4. The device of claim 1, wherein the phase compensator comprises:

a selector that provides first and second selection signals by performing at least one logical operation on external selection code signals; and a delay that delays a positive I-signal, a negative I-signal, a positive Q-signal and a negative Q-signal for different time periods, respectively, in response to the first and second selection signals provided by the selector.

5. The device of claim 4, wherein the selector comprises:

a first inverter for inverting a first selection code signal, a second inverter for inverting a second selection code signal, a third inverter for inverting a third selection code signal, a fourth inverter for inverting a signal from the third inverter, a first AND gate for subjecting the first and second selection code signals to a logical AND operation, a second AND gate for subjecting a signal from the first inverter and the second selection code signal to a logical AND operation, a third AND gate for subjecting the first selection code signal and a signal from the second inverter to a logical AND operation, a fourth AND gate for subjecting signals from both the first and second inverters to a logical AND operation, a fifth AND gate for subjecting signals from both the first AND gate and the third inverter to a logical AND operation, a sixth AND gate for subjecting signals from both the first AND gate and the fourth inverter to a logical AND operation, a seventh AND gate for subjecting signals from both the second AND gate and the third inverter to a logical AND operation, an eighth AND gate for subjecting signals from both the second AND gate and the fourth inverter to a logical AND operation, a ninth AND gate for subjecting signals from both the third AND gate and the third inverter to a logical AND operation, a tenth AND gate for subjecting signals from both the third AND gate and the fourth inverter to a logical AND operation, a first OR gate that generates a 2-bit signal based on the first selection signal by subjecting signals from both the fourth AND gate and the third inverter to a logical AND operation, and a second OR gate that generates a 2-bit signal based on the second selection signal for subjecting signals from both the fourth AND gate and the fourth inverter to a logical AND operation.

6. The device of claim 5, wherein each of the fifth, sixth, seventh, eighth, ninth, tenth AND gates and the first and second OR gates provide an inverted signal and a non-inverted signal.

7. The device of claim 4, wherein the delay comprises:

a first delay unit for delaying the positive Q-signal in response to the first selection signal from the selector, a second delay unit for delaying the negative Q-signal in response to the first selection signal from the selector, a third delay unit for delaying the positive I-signal in response to the second selection signal from the selector, and a fourth delay unit for delaying the negative I-signal in response to the second selection signal from the selector.

8. The device of claim 7, wherein each of the first through fourth delay units comprise:

a first delay part that delays the I and Q signals in response to the first and second selection signals from the selector, a fifth inverter that inverts an output from the first delay part, a second delay part that delays an output from the fifth inverter in response to at least one of the first and second selection signals from the selector, and a sixth inverter that inverts a signal from the second delay part.

9. The device of claim 8, wherein each of the first and second delay parts comprise:

a first transmission gate that delays transmission of an external signal for a time period >a= when a corresponding one of the first and second selection signals has a first predetermined state, a second transmission gate that delays transmission of an external signal for a time period >b= when a corresponding one of the first and second selection signals has the first predetermined state, a third transmission gate that delays transmission of an external signal for a time period 'c' when a corresponding one of the first and second selection signals has the first predetermined state, and a fourth transmission gate that delays transmission of an external signal for a time period 'd' when a corresponding one of the first and second selection signals has the first predetermined state.

10. The device of claim 9, wherein the delay time periods >a=, >b=, >c=and >d= are related such that >a=<>b=<>c=<>d=.

11. The device of claim 1, further comprising:

a first digital-to-analog converter for converting a digital signal into an analog signal synchronous to a clock signal;

a second digital-to-analog converter for converting a digital signal into an analog signal synchronous to a clock signal;

a first filter for filtering the analog signal from the first digital-to-analog converter to provide only a baseband signal;

a second filter for filtering the analog signal from the second digital-to-analog converter to provide only a baseband signal; and an I/Q local signal forwarder for forwarding a digital I-signal and a digital Q-signal, respectively, to the phase compensator, wherein the phase compensator compensates the I-signal and the Q-signal from the I/Q local signal forwarder for a phase error, wherein the first mixer mixes the I-signal from the phase compensator and the signal from the first filter and generates an IF band signal therefrom, wherein the second mixer mixes the Q-signal from the phase compensator and the signal from the second filter and generates an IF band signal therefrom, and wherein the summer sums signals from the first and second mixers to provide 2-bits of intermediate frequency signals.

12. The device of claim 11, wherein the first and second digital-to-analog converters convert the digital signals into analog signals synchronous to rising and falling edges of the clock signal, respectively.

13. The device of claim 11, wherein the QPSK modulation device converts baseband signals into intermediate frequency signals in a Code Division Multiple Access communication field.

14. A phase compensator, comprising:

a selector that provides first and second selection signals by performing at least one logical operation on external selection code signals; and a delay that delays a positive I-signal, a negative I-signal, a positive Q-signal and a negative Q-signal for different time periods, respectively, in response to the first and second selection signals provided by the selector.

15. The phase compensator of claim 14, wherein the selector comprises:

a first inverter for inverting a first selection code signal, a second inverter for inverting a second selection code signal, a third inverter for inverting a third selection code signal, a fourth inverter for inverting a signal from the third inverter, a first AND gate for subjecting the first and second selection code signals to a logical AND operation, a second AND gate for subjecting a signal from the first inverter and the second selection code signal to a logical AND operation, a third AND gate for subjecting the first selection code signal and a signal from the second inverter to a logical AND operation, a fourth AND gate for subjecting signals from both the first and second inverters to a logical AND operation, a fifth AND gate for subjecting signals from both the first AND gate and the third inverter to a logical AND operation, a sixth AND gate for subjecting signals from both the first AND gate and the fourth inverter to a logical AND operation, a seventh AND gate for subjecting signals from both the second AND gate and the third inverter to a logical AND operation, an eighth AND gate for subjecting signals from both the second AND gate and the fourth inverter to a logical AND operation, a ninth AND gate for subjecting signals from both the third AND gate and the third inverter to a logical AND operation, a tenth AND gate for subjecting signals from both the third AND gate and the fourth inverter to a logical AND operation, a first OR gate that generates a 2-bit signal based on the first selection signal by subjecting signals from both the fourth AND gate and the third inverter to a logical AND operation, and a second OR gate that generates a 2-bit signal based on the second selection signal for subjecting signals from both the fourth AND gate and the fourth inverter to a logical AND operation.

16. The phase compensator of claim 15, wherein each of the fifth, sixth, seventh, eighth, ninth, tenth AND gates and the first and second OR gates provide an inverted signal and a non-inverted signal.

17. The phase compensator of claim 14, wherein the delay comprises:

a first delay unit for delaying the positive Q-signal in response to the first selection signal from the selector, a second delay unit for delaying the negative Q-signal in response to the first selection signal from the selector, a third delay unit for delaying the positive I-signal in response to the second selection signal from the selector, and a fourth delay unit for delaying the negative I-signal in response to the second selection signal from the selector.

18. The phase compensator of claim 17, wherein each of the first through fourth delay units comprise:

a first delay part that delays the I and Q signals in response to the first and second selection signals from the selector, a fifth inverter that inverts an output from the first delay part, a second delay part that delays an output from the fifth inverter in response to at least one of the first and second selection signals from the selector, and a sixth inverter that inverts a signal from the second delay part.

19. The phase compensator of claim 18, wherein each of the first and second delay parts comprise:

a first transmission gate that delays transmission of an external signal for a time period >a= when a corresponding one of the first and second selection signals has a first predetermined state, a second transmission gate that delays transmission of an external signal for a time period >b= when a corresponding one of the first and second selection signals has the first predetermined state, a third transmission gate that delays transmission of an external signal for a time period 'c' when a corresponding one of the first and second selection signals has the first predetermined state, and a fourth transmission gate that delays transmission of an external signal for a time period 'd' when a corresponding one of the first and second selection signals has the first predetermined state.

20. The phase compensator of claim 19, wherein the delay time periods >a=, >b=, >c=and >d= are related such that >a=<>b=<>c=<>d=.

21. The phase compensator of claim 14, further comprising a phase modulator capable of converting baseband signals into intermediate frequency signals in a Code Division Multiple Access communication field.

* * * * *